Jan. 28, 1964     H. T. WHITE     3,119,343
MOTOR DRIVEN PUMPS
Filed Sept. 5, 1961
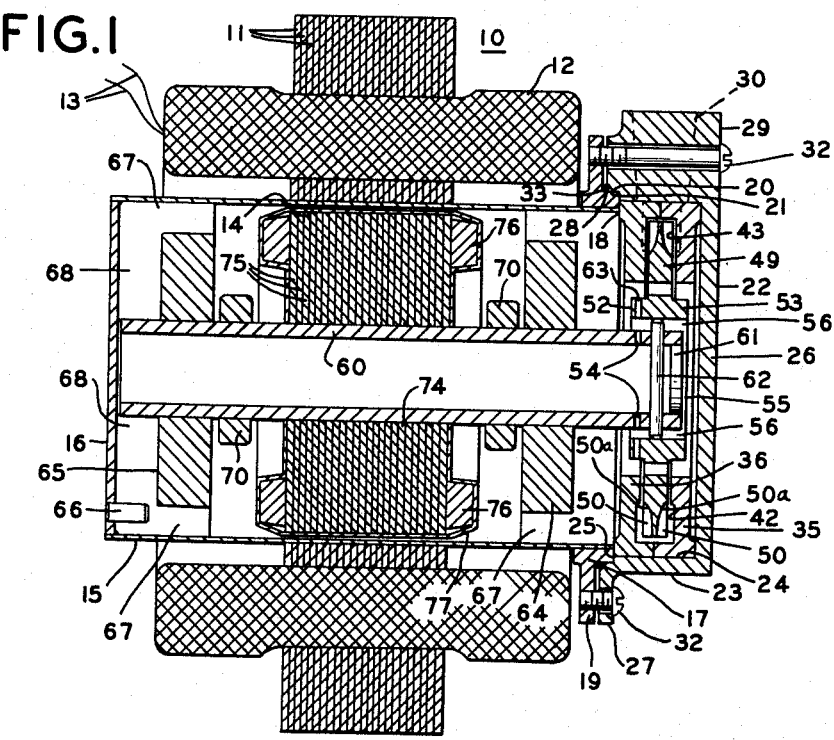
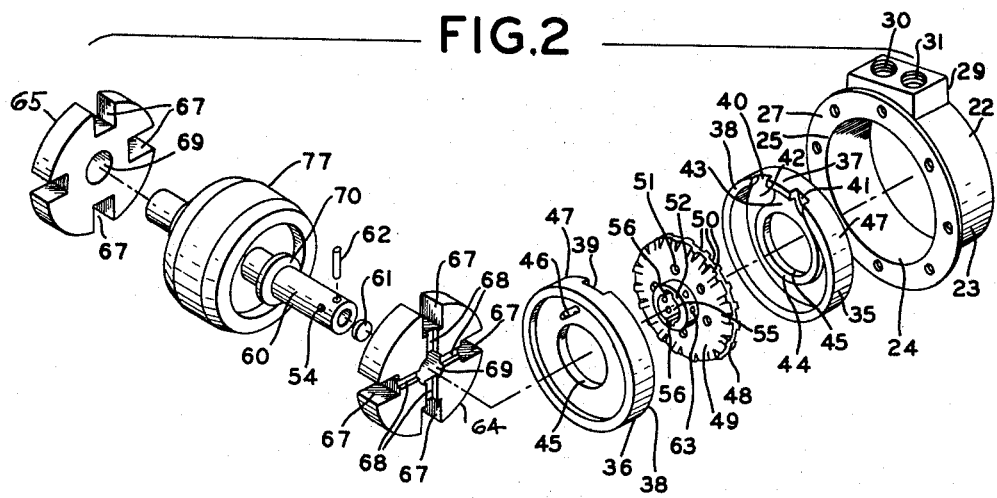
INVENTOR.
HOWARD T. WHITE
BY
*B. T. Wobensmith*
ATTORNEY United States Patent Office 3,119,343
Patented Jan. 28, 1964

3,119,343
MOTOR DRIVEN PUMPS
Howard T. White, Melrose Park, Pa., assignor to Fostoria Corporation, Huntingdon Valley, Pa., a corporation of Ohio
Filed Sept. 5, 1961, Ser. No. 136,025
5 Claims. (Cl. 103—87)

This invention relates to motor driven pumps.

Motor driven pumps of fractional horsepower must be of simple but reliable construction, should be capable of quick and easy assembly, and at the same time must be free from operating difficulties.

At the same time it is desirable, in some instances, that the pump although small in size have a high capacity.

It is the principal object of the present invention to provide a motor driven pump of small size in which the motor rotor and impeller are isolated from the motor stator and in which the impeller is constructed in a particularly effective manner.

It is a further object of the present invention to provide a motor driven pump in which the parts are so constructed and arranged that assembly thereof is greatly facilitated.

It is a further object of the present invention to provide a motor driven pump having provisions for circulation of fluid for cooling in a simple but effective manner.

It is a further object of the present invention to provide a motor driven pump of the sealless type in which an isolating sleeve is employed, interposed between the motor stator and the motor rotor and which serves to retain the shaft bearings in position and serves for the mounting of the stator and of the impeller housing.

It is a further object of the present invention to provide a motor driven pump in which the impeller is mounted in an improved manner so that the effect of endwise thrust on the motor shaft is eliminated.

It is a further object of the present invention to provide a motor driven pump in which the fluid impeller has an auxiliary cooling fluid circulating device embodied therein.

Other objects and advantageous features of the invention will be apparent from the description and claims.

The nature and characteristic features of the invention will be more readily understood from the following description, taken in connection with the accompanying drawings forming parts, in which:

FIGURE 1 is a longitudinal sectional view of a motor driven pump in accordance with the present invention; and FIG. 2 is an exploded perspective view of the parts contained within the impeller housing and stator isolating sleeve.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated, a motor stator 10 is provided having field laminations 11 and windings 12 to which conductors 13 extend from any suitable source of electrical energy, and preferably alternating current.

The laminations 11 have a central opening 14 within which a cylindrical isolating sleeve 15 is mounted. The sleeve 15 is of non-magnetic responsive material, and preferably is of stainless steel which is resistant to rusting and corrosion.

The sleeve 15, at one end thereof, is closed by an end closure plate 16 which is welded in place at the peripheral portion to the sleeve 15 thereby to provide a fluid tight joint at that location.

The sleeve 15, at the opposite end thereof, has an impeller housing mounting ring 17 welded or otherwise secured thereto. The ring 17 has an end face 18.

The ring 17 also has an outwardly extending flange portion 19 and a cylindrical peripheral face 20 for the reception of an inner cylindrical face 21 of an impeller housing 22.

The impeller housing 22 can be made as an integral casting or foregoing and has a cylindrical wall 23, with an interior cylindrical surface 24, an inner end face 25 abutting the end face 18 of the ring 17, an end wall 26 and a connecting flange 27.

A beveled packing compression face 28 is preferably provided at the junction of a portion of the flange 27 and the inner face 21.

The cylindrical wall 23 has a connector block 29 formed thereon with fluid connector openings 30 and 31 extending therethrough and to the interior surface 24.

The fluid connector openings 30 and 31 serve for the connection of fluid inlet and fluid delivery pipes (not shown), dependent upon the direction of rotation of the impeller, as hereinafter explained.

The connecting flange 27 is held in assembled relation with respect to the flange portion 18 of the mounting flange 17 by screws 32. In assembled relation the faces 20 and 21 are in engagement, the faces 18 and 25 are in engagement, and a packing ring 33, such as an O-ring, is provided and is compressed by engagement of the beveled face 28 therewith for preventing fluid leakage from the interior of the impeller housing 22 and the sleeve 15.

The impeller housing 22 has mounted therein front and rear turbine chamber plates 35 and 36 which are held against relative movement by a tongue 37 on the rim 38 of one plate which engages in a complemental slot 39 in the meeting rim 38 of the other, and at least one of the plates, such as the plate 35, has radial openings 40 and 41 for alignment with the fluid connector openings 30 and 31.

Each of the plates 35 and 36, inwardly of the rim 38, has an annular chamber 42 which is interrupted by an interposed abutment section 43 which separates the openings 39 and 40.

The plates 35 and 36 have central face portions 44 and a central opening 45. The plate 36 has a bearing block positioning pin 46 extending longitudinally axially and inwardly of the outer rim 47 thereof.

An impeller 48 is provided comprising a circular plate 49 with alternate slots 50 having curved roots 50a on opposite faces extending outwardly to the periphery. The plate 49 has a plurality of openings 51 therethrough. The plate has oppositely disposed hubs 52 and 53, one of which, such as the hub 52, has a plurality of inner impeller openings 54 therethrough for purposes to be explained.

The impeller plate 49 and hubs 52 and 53 have a central opening 55 therethrough with opposite longitudinal axial slots 56 for mounting the impeller 48 for rotation.

A hollow tubular shaft 60 is provided having an end closure plug 61 at one end thereof, and a diametrically extending pin 62 which is adapted to engage in the slots 56 to provide a mounting for the impeller 48 which permits longitudinal axial movement of the impeller 48. The shaft 60 is provided with a plurality of outer impeller openings 63 which preferably are substantially in alignment with the impeller openings 54 in the hub 52.

The shaft 60 is mounted in a pair of spaced bearing blocks 64 and 65 within the sleeve 15.

The bearing block 65, contiguous to the end closure plate 16, is held against rotation with respect to the sleeve 15 by a pin 66 which is secured to the end closure plate 16, and extends into one of a plurality of longitudinal peripheral slots 67 in the bearing block 65. Each of the bearing blocks 64 and 65 has additional radial slots 68 for fluid flow.

The bearing blocks 64 and 65 have central openings 69 through which the shaft 60 extends, and spaced positioning collars 70 mounted on the shaft 60 limit longitudinal movement of the shaft 60 with respect to the bearings 64 and 65.

The pin 46 extends into one of the slots 67 in the bearing block 64 and prevents rotation thereof.

A motor rotor 74 is provided on the shaft 60 between the positioning collars 70, and preferably includes a plurality of laminations 75 and short circuited pole pieces 76 of well known type.

The motor rotor 74 is preferably enclosed within a housing 77 of material, such as stainless steel, which is resistant to erosion and corrosion.

The mode of operation will now be pointed out.

The windings 12 of the motor stator 10 are energized through the connection of the conductors 13 to a suitable alternating current source and establish a rotating field which is effective for rotating the motor rotor 74 and the shaft 60 upon which the motor rotor 74 is mounted.

Upon rotation of the shaft 60, the impeller 48 is rotated by the engagement of the pin 62 in the slots 56 in the space between the turbine chamber plates 35 and 36.

Fluid entering one of the sets of fluid inlet openings, such as the connector opening 30 and the radial opening 40, and thus made available in the impeller chambers 42, is impelled by the slots 50 where it strikes the interior walls of the impeller chambers 42 on each side and is directed for entry and re-entry a plurality of times into the slots 50, between the inlet opening 40 and the outlet opening 41.

As the fluid is thus repeatedly picked up and impelled outwardly, additional velocity is imparted thereto, the fluid being moved in a general spiral path within the spaces in the impeller chamber 42. The fluid is thus advanced for delivery through the other radial opening 41 and fluid connector opening 31.

The action of the fluid on the opposite faces of the impeller plate 49, provides a pressure balance which tends to position the impeller 48 with substantially equal clearances on each side between the impeller plate 49 and the turbine chamber plates 35 and 36. The openings 42 permit transfer of fluid from one face of the plate 49 to the other. The impeller 48 can slide with respect to the pin 62 as required for its pressure balanced positioning.

Fluid within the sleeve 15 enters the shaft 60 at the end contiguous to the end closure plate 16 and passes outwardly through the inner and outer impeller openings 54 and 63 and the openings 68 and 67 in the bearing block 64. This fluid moves in the clearance space between the periphery of the motor rotor 74 and the interior of the sleeve 15 and the openings 67 and 68 in the bearing block 65 and to the open end of the shaft 60 at the end closure plate 16. The fluid circuit thus provided in the interior of the sleeve 14 makes fluid available for lubrication at the openings 69 and cooling the motor rotor 74.

I claim:

1. A motor driven pump comprising a cylindrical sleeve closed at one end by an end plate, a motor stator exteriorly disposed on said sleeve, an end ring at the other end of said sleeve having an outwardly extending flange, an impeller housing secured to said flange, said impeller housing having a central opening therein coaxial with and facing toward the interior of said sleeve, spaced bearings in said sleeve in peripheral engagement therewith, one of said bearings being held against rotation by a pin carried by said end plate, a hollow shaft journalled in said bearings and having a motor rotor thereon interiorly of said motor stator, said impeller housing having plate members therein held in engagement with each other and retained in position in said central opening by said end ring, said plate members having fluid passageways therein, one of said plate members having a pin for holding the other of said bearing members against rotation and being in abutting relation to the other of said bearing members, said shaft having a diametrically disposed pin, an impeller having a central portion with opposite longitudinal slots with which said pin is in engagement, said impeller having a peripheral fluid impelling portion extending between said plates, said impeller housing and said plate members having fluid inlet and fluid delivery passageways communicating with said fluid passageways.

2. In a motor driven pump, a cylindrical sleeve closed at one end, a motor stator exteriorly disposed on said sleeve, an end ring at the other end of said sleeve, an impeller housing secured to said end ring and having a central opening coaxial with and facing toward the interior of said sleeve, spaced bearings in said sleeve, a shaft journalled in said bearings and having a motor rotor thereon inwardly of said stator, said impeller housing having plate members therein in said central opening with opposite fluid passageways therearound, an impeller mounted on said shaft, said impeller having a fluid impelling portion at said fluid passageways, said plate members and said housing having fluid inlet and fluid delivery passageways communicating with the fluid passageways in said plate members, said closed end of said sleeve having a portion projecting therefrom in engagement with one of said bearing members for retaining said bearing member against rotation, one of said plate members having a portion projecting therefrom in engagement with the other of said bearing members for retaining said bearing member against rotation, said last plate member being in abutting relation to said other of said bearing members and limiting longitudinal movement thereof, and said shaft has spaced members thereon for limiting the movement of said bearings toward each other.

3. In a motor driven pump, a cylindrical sleeve closed at one end, a motor stator exteriorly disposed on said sleeve, an end ring at the other end of said sleeve, an impeller housing secured to said end ring and having a central opening coaxial with and facing toward the interior of said sleeve, spaced bearings in said sleeve, a shaft journaled in said bearings and having a motor rotor thereon inwardly of said stator, said impeller housing having plate members therein in said central opening with opposite fluid passageways therearound, an impeller, members for mounting said impeller on said shaft for free longitudinal axial movement with respect to said shaft, said impeller having a fluid impelling portion at said fluid passageways, said plate members and said housing having fluid inlet and fluid delivery passageways communicating with the fluid passageways in said plate members, said shaft being hollow and having radial openings therein and said impeller having a hub portion with radial openings therein aligned with said shaft openings for circulating fluid in the interior of said sleeve.

4. In a motor driven pump, a cylindrical sleeve closed at one end, a motor stator exteriorly disposed on said sleeve, an end ring at the other end of said sleeve, an impeller housing secured to said end ring and having a central opening coaxial with and facing toward the interior of said sleeve, spaced bearings in said sleeve, a shaft journalled in said bearings and having a motor rotor thereon inwardly of said stator, said impeller housing having plate members therein in said central opening with opposite fluid passageways therearound, an impeller, members for mounting said impeller on said shaft for free longitudinal axial movement with respect to said shaft, said impeller having a fluid impelling portion at said fluid passageways, said plate members and said housing having fluid inlet and fluid delivery passageways communicating with the fluid passageways in said plate members, the members for mounting said impeller comprising a diametrically disposed pin carried by said shaft in engagement with a longitudinal slot in said impeller.

5. In a motor driven pump, a cylindrical sleeve closed at one end, a motor stator exteriorly disposed on said sleeve, an end ring at the other end of said sleeve, an impeller housing secured to said end ring and having a central opening coaxial with and facing toward the interior of said sleeve, spaced bearings in said sleeve, a shaft journalled in said bearings and having a motor rotor thereon inwardly of said stator, said impeller housing having plate members therein in said central opening with opposite fluid passageways therearound, an impeller, members for mounting said impeller on said shaft for free longitudinal axial movement with respect to said shaft, said impeller having a fluid impelling portion at said fluid passageways, said plate members and said housing having fluid inlet and fluid delivery passageways communicating with the fluid passageways in said plate members, said bearings being in peripheral engagement with said sleeve, the end of the sleeve having a projection for holding one of the bearings against rotation and one of said plate members having a projection for holding the other of the bearings against rotation, said one of said plate members being in abutting relation to the other of said bearings to limit longitudinal movement thereof, and said shaft having members thereon for limiting the movement of the bearings toward each other.

References Cited in the file of this patent

UNITED STATES PATENTS

| | | |
|---|---|---|
| 1,595,636 | Walters et al. | Aug. 10, 1926 |
| 2,364,168 | Shallenberg | Dec. 5, 1944 |
| 2,822,758 | Dove | Feb. 11, 1958 |
| 2,871,791 | Litzenberg | Feb. 3, 1959 |